United States Patent
Riley (10) Patent No.: US 7,469,545 B2
(45) Date of Patent: Dec. 30, 2008

(54) AUXILIARY POWER UNIT INLET DOOR POSITION CONTROL SYSTEM AND METHOD

(75) Inventor: Harold J. Riley, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 583 days.

(21) Appl. No.: 11/237,540

(22) Filed: Sep. 27, 2005

(65) Prior Publication Data

US 2007/0068169 A1 Mar. 29, 2007

(51) Int. Cl.
*F02C 7/04* (2006.01)
*F02C 9/16* (2006.01)

(52) U.S. Cl. ........................ 60/794; 244/53 B
(58) Field of Classification Search ................ 60/39.23, 60/39.27, 794; 244/53 B
See application file for complete search history.

(56) References Cited

U.S. PATENT DOCUMENTS

| | | | |
|---|---|---|---|
| 4,406,117 A | 9/1983 | Rowen et al. | |
| 5,097,658 A | 3/1992 | Klaass et al. | |
| 5,161,363 A | 11/1992 | Klaass et al. | |
| 5,165,223 A | 11/1992 | Ingham et al. | |
| 5,487,265 A | 1/1996 | Rajamani et al. | |
| 5,584,171 A | 12/1996 | Sato et al. | |
| 5,636,507 A | 6/1997 | Rajamani et al. | |
| 5,857,321 A | 1/1999 | Rajamani et al. | |
| 6,164,057 A | 12/2000 | Rowen et al. | |
| 6,247,668 B1 * | 6/2001 | Reysa et al. | ................ 244/53 B |
| 6,338,240 B1 | 1/2002 | Endo et al. | |
| 6,349,899 B1 | 2/2002 | Ralston | |
| 6,364,602 B1 | 4/2002 | Andrew et al. | |
| 6,442,928 B1 | 9/2002 | Endo et al. | |
| 6,651,929 B2 | 11/2003 | Dionne | |

FOREIGN PATENT DOCUMENTS

| | | |
|---|---|---|
| EP | 1069044 A2 | 1/2001 |
| WO | 0055485 | 9/2000 |
| WO | 2005016748 A2 | 2/2005 |

OTHER PUBLICATIONS

EP Search Report, 06121311.2, dated Jan. 4, 2008.

* cited by examiner

*Primary Examiner*—Louis J Casaregola
(74) *Attorney, Agent, or Firm*—Ingrassia Fisher & Lorenz, P.C.

(57) ABSTRACT

An auxiliary power unit (APU) includes a controller that controls the position of an APU inlet door, and thus ram air flow to the APU, to ensure optimal starting conditions are attained and maintained in the APU during APU startup operations. The controller receives a signal representative of an APU operational parameter and, in response, to supplies APU inlet door position commands. An APU inlet door actuator is coupled to the APU inlet door and, in response to the APU inlet door position commands, moves the APU inlet door to the commanded position.

17 Claims, 5 Drawing Sheets

AUXILIARY POWER UNIT INLET DOOR POSITION CONTROL SYSTEM AND METHOD

TECHNICAL FIELD

The present invention relates to aircraft auxiliary power units (APUs) and, more particularly, to a system and method for controlling the position of an inlet door to an APU.

BACKGROUND

In many aircraft, the main propulsion engines not only provide propulsion for the aircraft, but may also be used to drive various other rotating components such as, for example, generators, compressors, and pumps, to thereby supply electrical and/or pneumatic power. However, when an aircraft is on the ground, its main engines may not be operating. Moreover, in some instances the main propulsion engines may not be capable of supplying the power needed for propulsion as well as the power to drive these other rotating components. Thus, many aircraft include one or more auxiliary power units (APUs) to supplement the main propulsion engines in providing electrical and/or pneumatic power. An APU may also be used to start the propulsion engines.

An APU is, in most instances, a gas turbine engine that includes a combustion system, a power turbine, a compressor, and an APU controller. During operation of the APU, the compressor draws in ambient air via an inlet duct, compresses the air, and supplies compressed air to the combustion system. The combustion system, under control of the APU controller, receives a flow of fuel from a fuel source and the compressed air from the compressor, and supplies high-energy combusted gas to the power turbine, causing it to rotate. The gas is then exhausted from the APU 100 via an exhaust duct. The power turbine includes a shaft that may be used to drive a generator for supplying electrical power, and to drive its own compressor and/or an external load compressor.

An APU may be started using any one of numerous techniques. Typically, however, an electrically-powered starter motor is used to supply a starting torque to the shaft. As the shaft rotates, the compressor draws ambient air through the APU inlet door and inlet duct, compresses the air, and supplies the compressed air to the combustor. Simultaneously, the APU controller, implementing control logic, controls fuel flow into the combustor system to maintain a desired fuel/air ratio. When the APU rotational speed reaches a predetermined speed, and when the fuel/air ratio attains what is generally referred to as "light-off conditions," the APU controller ignites the fuel/air mixture. Thereafter, the APU power turbine augments the starter motor torque. When the APU rotational speed attains a predetermined operational speed, the APU controller de-energizes the starter motor, and the APU becomes self-sustaining and accelerates itself to operational speed.

From the above, it may be understood that a successful APU start depends on the APU rotational speed and the appropriate fuel/air ratio in the combustor, which may in turn depend on the airflow through, and thus the differential air pressure across, the APU. Too little airflow through the APU can cause high APU exhaust gas temperatures, which often cause a "hung start," and too much airflow can prevent fuel/air ignition or cause a "blow out" of the ignited fuel/air mixture. It may additionally be understood that the differential air pressure across the APU may depend on the ambient conditions during APU startup.

Although the control logic presently implemented in APUs is safe and generally reliable, it does suffer certain drawbacks. For example, the control logic does not control the differential pressure across the APU to ensure optimal starting conditions are attained. The present invention addresses at least this need.

BRIEF SUMMARY

The present invention provides an APU controller that controls the position of the APU inlet door to ensure optimal starting conditions are attained and maintained in the APU during APU startup operations.

In one embodiment, and by way of example only, an auxiliary power unit (APU) inlet door control system includes an APU controller and an APU inlet door actuator. The APU controller is adapted to receive a signal representative of an APU operational parameter and is operable, in response to the APU operational parameter signal, to supply APU inlet door position commands. The APU inlet door actuator is adapted to couple to an APU inlet door, and is coupled to receive the APU inlet door position commands. The APU inlet door actuator is operable, in response to the APU inlet door position commands, to move to a position representative of the commanded APU inlet door position.

In another exemplary embodiment, an auxiliary power unit (APU) inlet door control system includes an APU controller, an APU inlet door, and an actuator. The APU controller is adapted to receive a signal representative of APU exhaust gas temperature and is operable, in response thereto, to supply APU inlet door position commands. The APU inlet door is movable between a closed position, a maximum open position, and a plurality of positions between the closed and maximum open positions. The actuator is coupled to the APU inlet door, and is further coupled to receive the APU inlet door position commands. The actuator is operable, in response to the APU inlet door position commands, to move the APU inlet door to a position representative of the commanded APU inlet door position.

In yet a further exemplary embodiment, a method of controlling auxiliary power unit (APU) inlet door position includes determining a value of an operational parameter within the APU, and varying the APU inlet door position based on the determined value of the operational parameter.

Other independent features and advantages of the preferred APU inlet door control system and method will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description.

Figure 1:
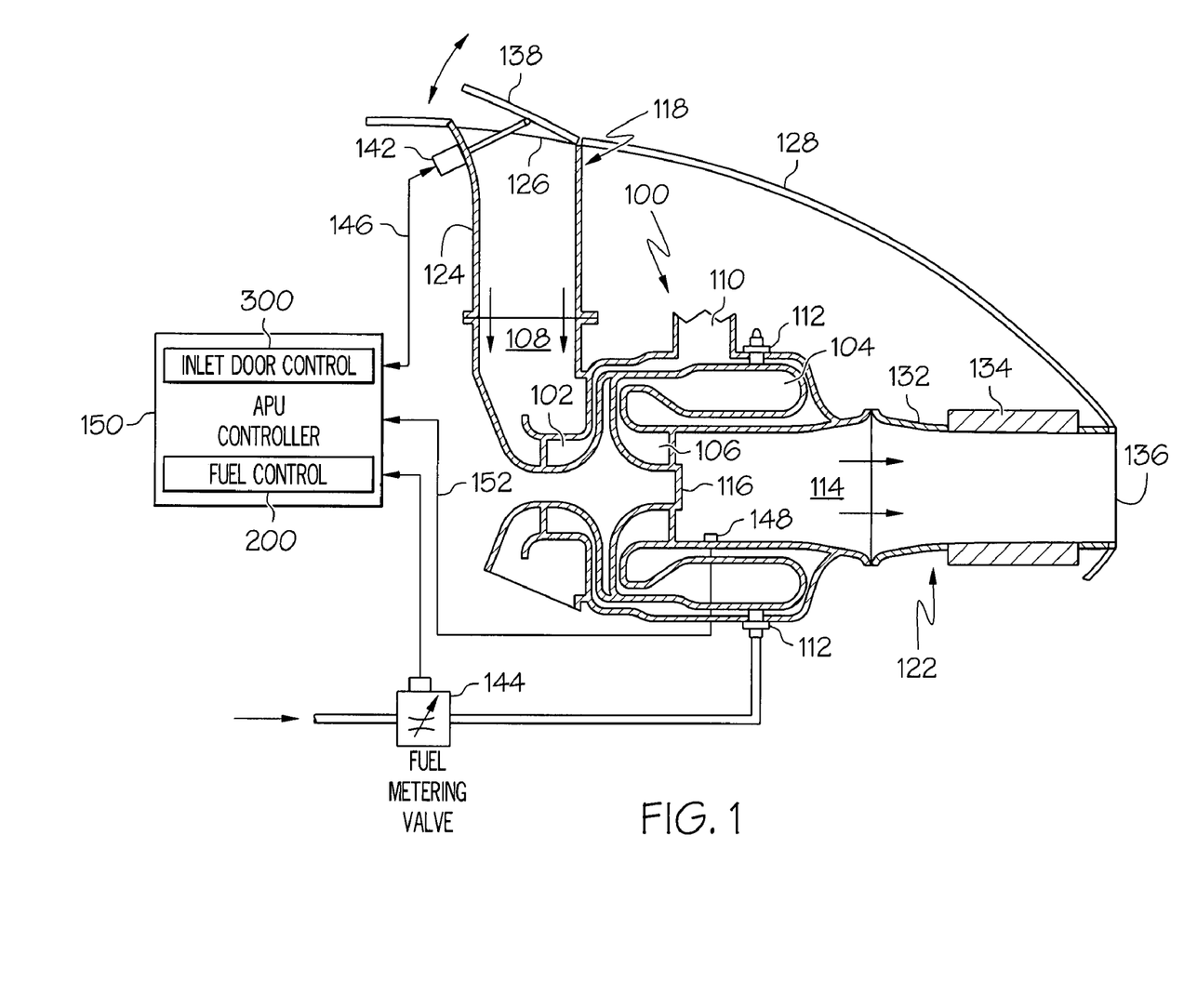
FIG. 1 is a simplified cross section view of an exemplary embodiment of an auxiliary power unit (APU) coupled to an APU controller.

Turning first to FIG. 1, a simplified cross section view of an exemplary embodiment of an auxiliary power unit (APU) is shown. The APU 100 includes a compressor 102, a combustor 104, and a turbine 106. Air is directed into the compressor 102 via an air inlet 108. The compressor 102 raises the pressure of the air and supplies compressed air to both the combustor 104 and, in the depicted embodiment, to a bleed air outlet port 110. In the combustor 104, the compressed air is mixed with fuel that is supplied to the combustor 104 from a non-illustrated fuel source via a plurality of fuel nozzles 112. The fuel/air mixture is combusted, generating high-energy gas, which is then directed into the turbine 106.

The high-energy gas expands through the turbine 106, where it gives up much of its energy and causes the turbine 106 to rotate. The gas is then exhausted from the APU 100 via an exhaust gas outlet 114. As the turbine 106 rotates, it drives, via a turbine shaft 116, various types of equipment that may be mounted in, or coupled to, the APU 100. For example, in the depicted embodiment the turbine 106 drives the compressor 102. It will be appreciated that the turbine 106 may also be used to drive a generator and/or a load compressor and/or other rotational equipment, which are not shown in FIG. 1 for ease of illustration.

As FIG. 1 additionally shows, the compressor inlet 108 is coupled to an air inlet system 118, and the exhaust gas outlet 114 is coupled to an exhaust system 122. The inlet system 118 includes an inlet duct 124 that is coupled between the compressor inlet 108 and a ram air inlet 126 that is formed, for example, through a section of an aircraft fuselage 128. The exhaust system 122 includes an outlet duct 132 and muffler 134. The exhaust duct 132 is coupled between the turbine exhaust gas outlet 114 and an exhaust opening 136 that is also formed, for example, through a section of the aircraft fuselage 128.

An APU inlet door 138 is rotationally mounted adjacent to the ram air inlet 126 and is movable, via an inlet door actuator 142, to a plurality of positions between a closed position and a maximum open position. When the inlet door actuator 142 moves the APU inlet door 138 to the closed position, the inlet door 138 seals the ram air inlet 126, preventing air flow into and through the inlet duct 124 to the APU 100. When the inlet door actuator 142 moves the APU inlet door 138 out of the closed position, ram air may flow through the ram air inlet 126, and into and through the inlet duct 124 to the APU 100. It will be appreciated that the rate at which ram air flows into and through the inlet duct 124 will vary depending on the position to which the inlet door actuator 142 has moved the APU inlet door 138.

The APU 100 is controlled via an electronic control unit 150, which is referred to herein as an APU controller. The APU controller 150 implements various control logic to control the operation of the APU 100. In particular, the APU controller 150, at least in the depicted embodiment, implements fuel control logic 200 and inlet door control logic 300. In the depicted embodiment, the fuel control logic 200 controls fuel flow to the combustor fuel nozzles 112 by controlling the position of a fuel metering valve 144. It will be appreciated that the use of a single fuel metering valve 144 is merely exemplary of the depicted embodiment, and that the fuel control logic 200 could instead, or additionally, control fuel flow by controlling one or more additional valves or pumps. It will additionally be appreciated that the fuel control logic 200 may be implemented according to any one of numerous fuel control logic schemes, now known or developed in the future. A detailed description of the fuel control logic is not needed to enable or fully describe the instant invention, and will thus not be further described. Nonetheless, for completeness it is noted that one particular fuel control logic scheme that may be used, and which was invented by the instant inventor and assigned to the Assignee of the instant application, is disclosed in U.S. patent application Ser. No. 10/711,154, and is hereby incorporated in its entirety by reference.

The inlet door control logic 300 receives a signal representative of an APU operational parameter and, in response to this signal, supplies APU inlet door position commands 146 to the APU inlet door actuator 142. The APU inlet door actuator 142, in response to the APU inlet door position commands 146, moves the APU inlet door 138 to the commanded position. It will be appreciated that the particular APU operational parameter that is used in the inlet door control logic 300 may vary. In the depicted embodiment, however, the APU operational parameter is an APU temperature, and more particularly, exhaust gas temperature (EGT). Thus, as FIG. 1 additionally depicts, the APU 100 further includes an EGT sensor 148 that senses exhaust gas temperature and supplies an EGT signal 152 representative thereof to the APU controller 150 for use in the inlet door control logic 300.

Figure 2:
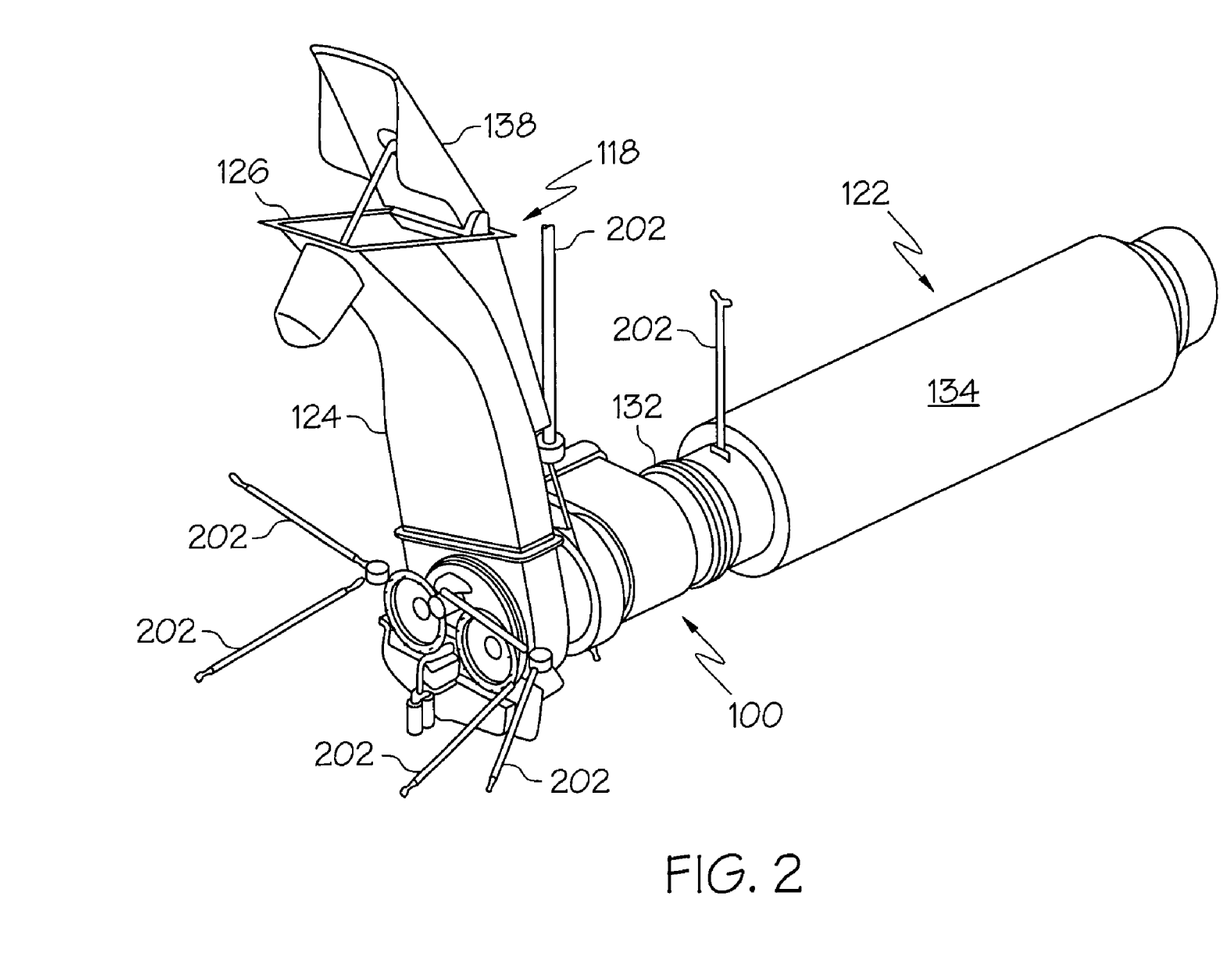
FIG. 2 is a perspective view of an embodiment of a physical implementation of the APU shown in FIG. 1 coupled to air inlet and air outlet systems.
Figure 3:
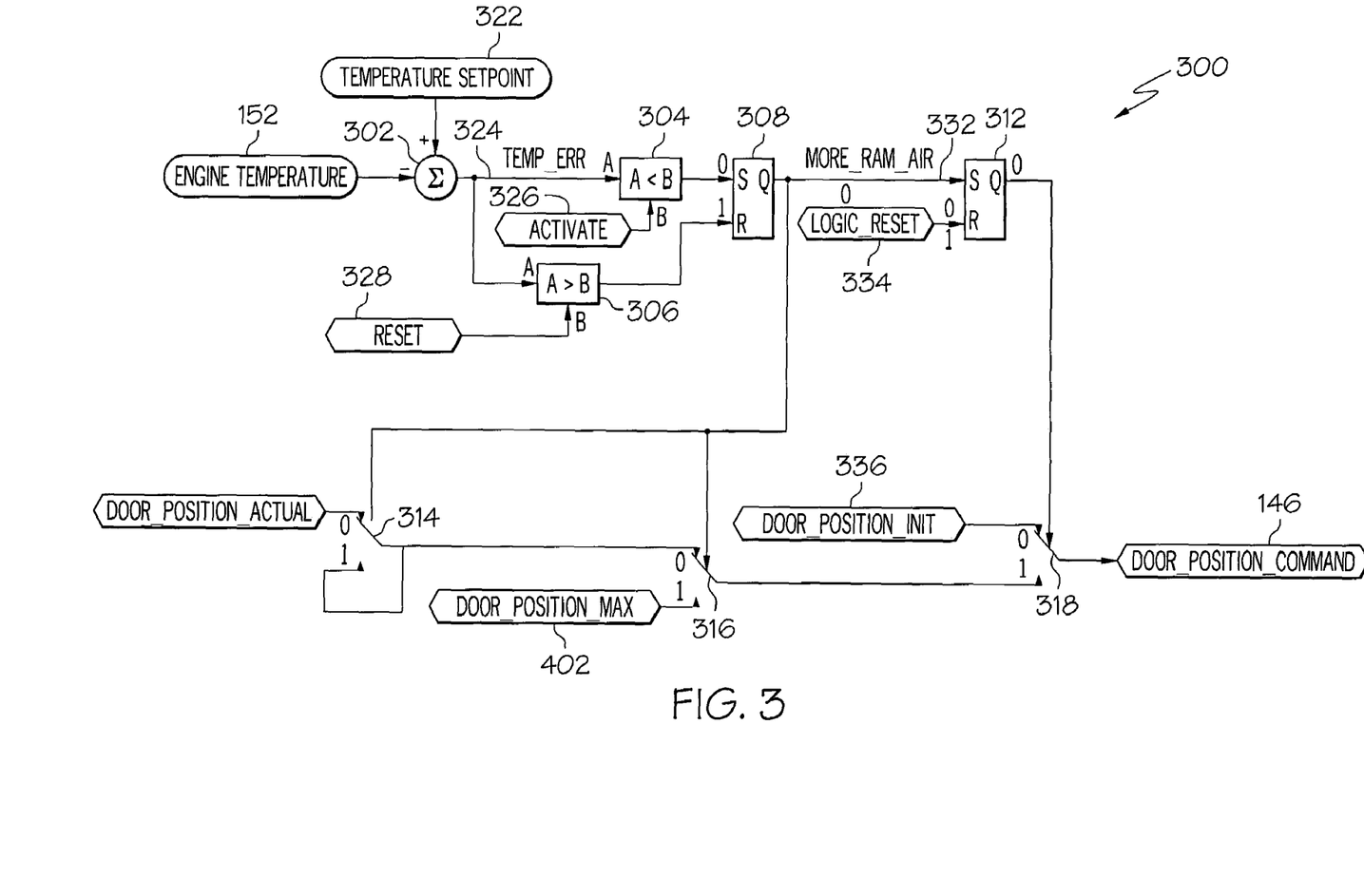
FIGS. 3-5 are functional control logic diagrams that depict the APU inlet door control logic, in various operational configurations, that is implemented in the APU controller of FIG. 1.
Figure 4:
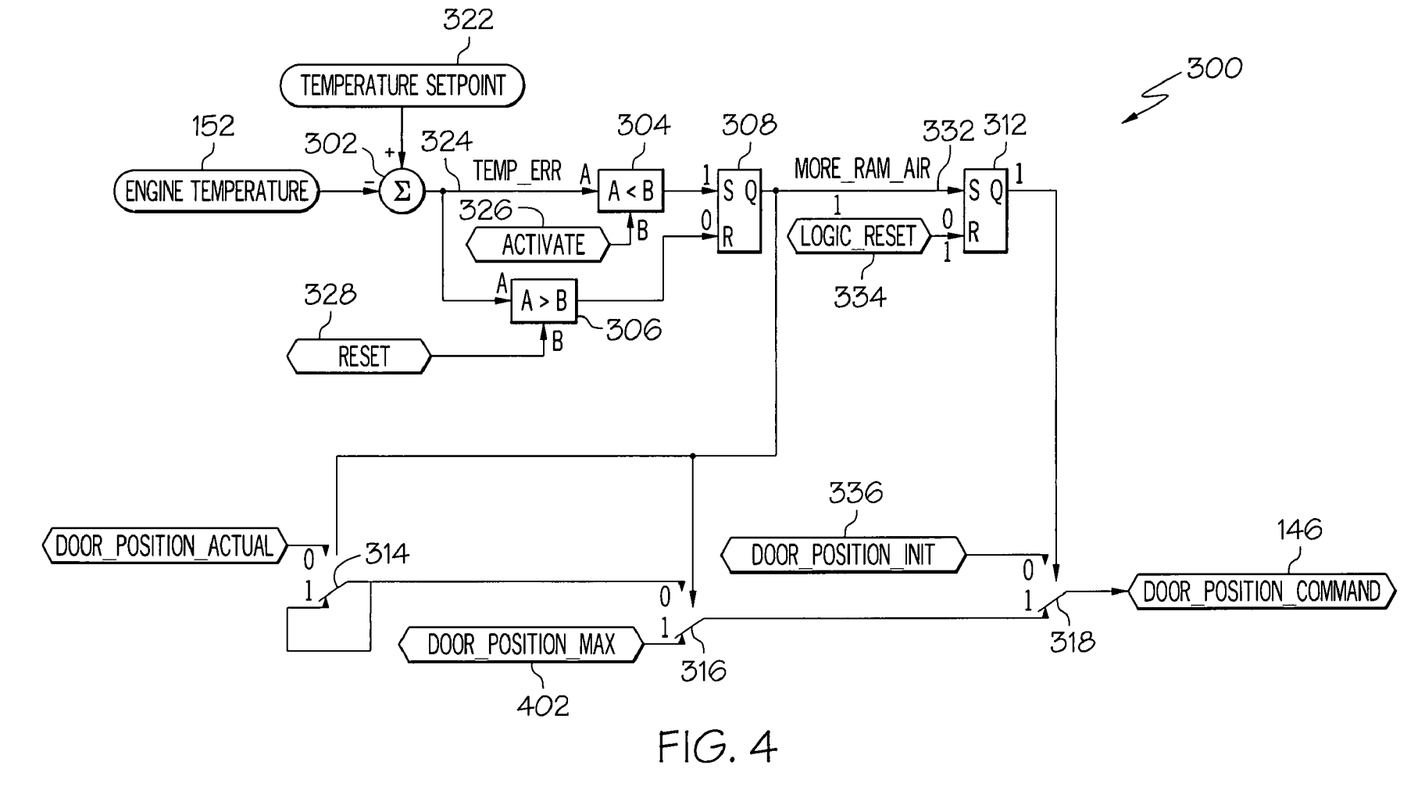
Figure 5:
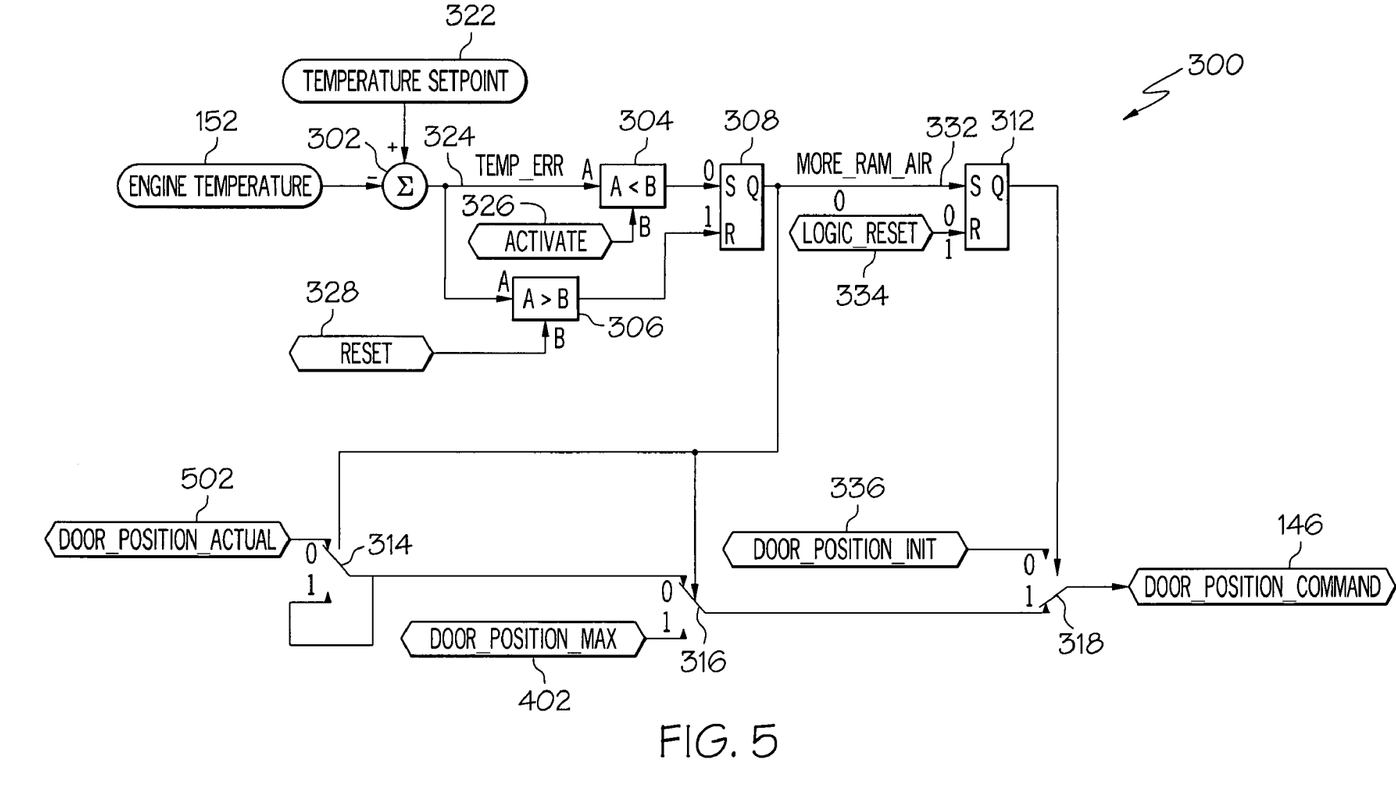

The inlet door control logic 300 is depicted in FIGS. 3-5, and will be described in detail below. Before doing so, however, it is noted that a perspective view of an exemplary physical embodiment of the APU 100, the air inlet system 118, and the exhaust system 122, are depicted, for additional clarity, in FIG. 2. It is further noted that FIG. 2 additionally depicts a mount system 202, which is used to mount the APU 100 in the aircraft fuselage 128 (not shown in FIG. 2).

Turning now to FIGS. 3-5, an exemplary embodiment of the inlet door control logic 300 will now be described in detail. As FIGS. 3-5 illustrate, the inlet door control logic 300 may be depicted using various schematic symbols that represent physical components. It will be appreciated, however, that this is done merely for clarity and ease of description, and that the inlet door control logic 300 could be implemented using one or more of the depicted discrete physical components, or it could be implemented wholly or partially, in software, firmware, hardware, or various combinations thereof.

No matter the particular manner in which the inlet door control logic 300 is physically implemented, it is seen that, at least in the depicted embodiment, the inlet door control logic 300 includes a subtraction function 302, a first comparator function 304, a second comparator function 306, first set-reset (SR) latch logic 308, second SR latch logic 312, and first, second, and third logic switch functions 314, 316, and 318, respectively. The subtraction function 302 receives a value representative of the APU operational parameter 152 and a setpoint value 322 and, in response, supplies an error value 324 that is representative of the mathematical difference between the two values.

The parameter that the setpoint value 322 represents may vary depending, for example, on the particular APU operational parameter 152 that is being used. In the depicted embodiment, however, in which the APU operational parameter 152 is exhaust gas temperature, the setpoint value 322 represents a temperature setpoint, and more particularly a temperature trim setpoint. The temperature trim setpoint 322 and the exhaust gas temperature value 152 are also used in the fuel control logic 200 to trim fuel flow below a predetermined fuel flow schedule, if necessary, during startup, to avoid high turbine exhaust temperatures.

From the above it is seen that, at least in the depicted embodiment, the error value 324 is a temperature error value (TEMP_ERR), which is supplied to both the first and second comparator functions 304, 306. The first comparator function 304 compares the temperature error value 324 to an activation value (ACTIVATE) 326, and the second comparator function compares the temperature error value 324 to a reset value (RESET) 328. The first comparator function 304 generates a logical "1" value, if the temperature error value 324 is less than the activation value 326, and generates a logical "0" value if it is not. Conversely, the second comparator function 306 generates a logical "1" value if the temperature error value 324 is greater than the reset value 328, and generates a logical "0" if it is not. It will be appreciated that the specific values for the activation value 326 and the reset value 328 may vary, and are preferably selected to provide a desired level of performance and control.

The logical value generated by the first comparator function 304 is supplied to the set (S) terminal of the first SR latch logic 308, and the logical value generated by the second comparator function 306 is supplied to the reset (R) terminal of the first SR latch logic 308. The first SR latch logic 308 generates a logical value (MORE_RAM_AIR) 332 on its Q terminal that, as is generally known, will be either a logical "1" value or a logical "0" depending on the logic values supplied to its S and R terminals. More specifically, if the S terminal and R terminal are supplied with a logical "1" value and a logical "0" value, respectively, the first SR latch logic 308 will generate a logical "1" value on its Q terminal. Conversely, if the S terminal and R terminal are supplied with a logical "0" value and a logical "1" value, respectively, the first SR latch logic 308 will generate a logical "0" value on its Q terminal. If the S terminal and R terminal are both supplied with logical "1" values, the first SR latch logic 308 will generate a logical "0" value on its Q terminal. Conversely, if the S terminal and R terminal are both supplied with logical "0" values, the first SR latch logic 308 will be "latched." Being latched means that the first SR latch logic 308 will continue to generate on its Q terminal whatever logical value (either "0" or "1") that was being generated just prior to the S and R terminals being simultaneously supplied with logical "0" values.

The logical value that is generated on the Q terminal of the first SR latch logic 308 is used to control the positions of the first and second logic switches 314 and 316, respectively, and is additionally supplied to the S terminal of the second SR latch logic 312. The R terminal of the second SR latch logic 312 is supplied with a logic reset value (LOGIC_RESET) 334. The logic reset value 334 is normally set to a logical "0" value. However, upon initialization of the APU controller for startup, or following successful completion of APU 100 startup, the logic reset value 334 may be momentarily set to a logical "1" value. This ensures the second SR latch logic 312 is reset, and generating a logical "0" value on its Q terminal. Thus, it may be seen that, with a logical "0" on its R terminal, the logical value generated on the Q terminal of the second SR latch logic 312 generally follows the logical value (MORE_RAM_AIR) 332 that is generated on the Q terminal of the first SR latch logic 308. It may additionally be seen that the logical value generated on the Q terminal of the second SR latch logic 312 is used to control the position of the third logic switch 318.

With continued reference to FIG. 3, and with additional reference, as directed, to FIGS. 4 and 5, the operation of the inlet door control logic 300 during APU startup will now be described. When the APU 100 is initially being started up, the EGT is relatively cool, and thus the EGT value 152 is a relatively low value as compared to the temperature trim setpoint value 322. As a result, the temperature error value (TEMP_ERR) 324 supplied from the subtraction function 302 will not be less than the activation value (ACTIVATE) 326, and will likely be greater than the reset value (RESET) 328. Therefore, as FIG. 3 depicts, the logical value generated by the first comparator function 304 and supplied to the S terminal of the first SR latch logic 308 is a logical "0" value, and the logical value generated by the second comparator function 306 and supplied to the R terminal of the first SR latch logic 308 is a logical "1" value. As FIG. 3 also depicts, the logical value generated on the Q terminal of the first SR latch logic 308 is a logical "0" value, which means that the logical value generated on the Q terminal of the second SR latch logic 312 is also a logical "0" value.

With the above-described conditions, it is seen that the APU inlet door position command (DOOR_POSITION_COMMAND) 146, which is supplied to the inlet door actuator 142, is a predetermined initial APU inlet door position command (DOOR_POSITION_INIT) 336. Thus, the inlet door actuator 142 moves the APU inlet door 138 to a position corresponding to this predetermined initial position command 336. It will be appreciated that the initial APU inlet door position command 336 may vary, but is selected to assure light-off and normal APU acceleration for most operating conditions. Indeed, for some APU startup operations, the APU inlet door 138 may remain in the initial position throughout the startup. However, the age and health of the APU 100, and the ambient conditions during the APU startup may cause the APU acceleration to drop below its expected acceleration profile. When this occurs, the fuel control logic 200 increases fuel flow in an attempt to regain the desired acceleration profile, which in turn causes the EGT value 152 to rise.

As the EGT value 152 approaches the temperature trim setpoint 322, the fuel control logic 200 cuts back the fuel flow to prevent exceeding the temperature trim setpoint 322. However, if the EGT value 152 rises sufficiently high that the temperature error value (TEMP_ERR) 324 is less than the activation value (ACTIVATE) 326 then, as shown in FIG. 4, the logical value generated by the first comparator function 304 and supplied to the S terminal of the first SR latch logic 308 is a logical "1" value, and the logical value generated by the second comparator function 306 and supplied to the R terminal of the first SR latch logic 308 is a logical "0" value. As FIG. 4 also depicts, the logical value (MORE_RAM_AIR) 332 generated on the Q terminal of the first SR latch logic 308 is then a logical "1" value, which means that the logical value generated on the Q terminal of the second SR latch logic 312 is also a logical "1" value.

When the above-described conditions occur, it is seen that the APU inlet door position command (DOOR_POSITION_COMMAND) 146 is set to an APU inlet door maximum position command (DOOR_POSITION_MAX) 402. Thus, the inlet door actuator 142 begins moving the APU inlet door 138 toward a position that corresponds to the maximum position command 402. It will be appreciated that the maximum position command 402 may vary, but is selected to be representative of the APU inlet door position that corresponds to the position at which maximum ram air flow is attained. It will be appreciated that this position may vary with the particular design and configuration of the APU inlet door 138. In any case, as the APU inlet door 138 begins moving from the initial door position toward the maximum position, ram air flow into the APU 100 increases. The increased ram air flow causes the APU 100 to accelerate, and the EGT value 152 to decrease.

When the EGT value 152 decreases sufficiently low that the temperature error value (TEMP_ERR) 324 is no longer less than the activation value (ACTIVATE) 326, and is once again greater than the reset value (RESET) 328 then, as shown in FIG. 5, the logical values generated by the first comparator function 304 and supplied to the S terminal of the first SR latch logic 308 becomes a logical "0" value, and the logical value generated by the second comparator function 306 and supplied to the R terminal of the first SR latch logic 308 becomes a logical "1" value. As FIG. 5 also depicts, the logical value (MORE_RAM_AIR) 332 generated on the Q terminal of the first SR latch logic 308 then becomes a logical "0" value. Because the logic reset value (LOGIC_RESET) 334 is also a logical "0" value, the second SR latch logic 312 is latched. Thus, the logical value generated on the Q terminal of the second SR latch logic 312 remains latched at a logical "1" value.

With the above-described conditions, the APU inlet door position command (DOOR_POSITION_COMMAND) 146 is set to the position (DOOR_POSITION_ACTUAL) 502 the APU inlet door 138 was in when the first SR latch logic 308 reset. Thus, the inlet door actuator 142 holds the APU inlet door 138 at this position, and ram air flow into the APU 100 remains substantially constant. The APU inlet door 138 will remain in this position for the remainder of the startup operation, unless the EGT value 152 again rises sufficiently high that the temperature error value (TEMP_ERR) 324 becomes less than the activation value (ACTIVATE) 326. In such an instance, the inlet door logic 300 will once again be configured as depicted in FIG. 4, and the APU inlet door actuator 142 will once again be commanded to move the APU inlet door 138 toward the maximum open position, to further increase ram air flow to the APU 100.

From the above descriptions, it is seen that the inlet door control logic 300 is preferably implemented such that the APU inlet door 138 is only commanded to move in a direction associated with more ram air flow during an APU startup operation. It will be appreciated, however, that this is merely exemplary, and that the inlet door control logic 300 could, if so desired, be implemented to modulate the position of the APU inlet door 138 in directions associated with both more and less ram air flow during APU startup operations. In either case, the control logic implemented by the APU controller 150 controls the position of the APU inlet door 138 to ensure successful light-off conditions are attained and maintained in the APU 100 during APU startup operations.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An auxiliary power unit (APU) inlet door control system, comprising:
   an APU controller adapted to receive a signal representative of a temperature within the APU and operable, in response thereto, to supply APU inlet door position commands; and
   an APU inlet door actuator adapted to couple to an APU inlet door, the APU inlet door actuator coupled to receive the APU inlet door position commands and operable, in response thereto, to move to a position representative of the commanded APU inlet door position.

2. The system of claim 1, wherein:
   the APU controller is further adapted to receive an APU start initialization signal, the APU start initialization signal indicating that the APU is initialized for started up;
   the APU controller is further operable, upon receipt of the APU start initialization signal, to supply an APU inlet door position command representative of a predetermined APU inlet door start position; and
   the APU inlet door actuator is further operable, upon receipt of the APU inlet door position command, to move to a position representative of the predetermined APU inlet door start position.

3. The system of claim 2, wherein:
   the APU controller is further adapted to receive an APU start completion signal, the APU start completion signal indicating that the APU has been started and is operational; and
   the APU controller is further operable, upon receipt of the APU start completion signal, to cease supplying updated APU inlet door position commands.

4. The system of claim 3, wherein the APU controller, from receipt of the APU start initialization signal until receipt of the start completion signal, is operable to supply only APU inlet door position commands that will result in increased airflow to the APU.

5. The system of claim 3, wherein the APU controller, upon receipt of the APU start completion signal, continuously supplies the APU inlet door position command that was supplied to the APU inlet door actuator when the start completion signal was received.

6. The system of claim 1, wherein:
   the APU controller is further operable to compare the APU operational parameter to a setpoint value and, if the APU operational parameter is within a predetermined range of the setpoint value, supply an APU inlet door position command; and
   the APU inlet door actuator is operable, in response to the APU inlet door open command, to move to a position representative of the commanded APU inlet door open position.

7. The system of claim 1, wherein the temperature within the APU is APU exhaust gas temperature (EGT).

8. An auxiliary power unit (APU) inlet door control system, comprising:
   an APU controller adapted to receive a signal representative of APU exhaust gas temperature and operable, in response thereto, to supply APU inlet door position commands;
   an APU inlet door movable to a plurality of positions between a closed position and a maximum open position; and
   an actuator coupled to the APU inlet door, the actuator further coupled to receive the APU inlet door position commands and operable, in response thereto, to move the APU inlet door to a position representative of the commanded APU inlet door position.

9. The system of claim 8, wherein:
   the APU controller is further adapted to receive an APU start initialization signal, the APU start initialization signal indicating that the APU is initialized for started up;
   the APU controller is further operable, upon receipt of the APU start initialization signal, to supply an APU inlet door position command representative of a predetermined APU inlet door start position; and the APU inlet door actuator is further operable, upon receipt of the APU inlet door position command, to move the APU inlet door to a position representative of the predetermined APU inlet door start position.

10. The system of claim 9, wherein:

the APU controller is further adapted to receive an APU start completion signal, the APU start completion signal indicating that the APU has been started and is operational; and the APU controller is further operable, upon receipt of the APU start completion signal, to cease supplying updated APU inlet door position commands.

11. The system of claim 10, wherein the APU controller, from receipt of the APU start initialization signal until receipt of the start completion signal, is operable to supply only APU inlet door position commands that will result in increased airflow to the APU.

12. The system of claim 10, wherein the APU controller, upon receipt of the APU start completion signal, continuously supplies the APU inlet door position command that was supplied to the APU inlet door actuator when the start completion signal was received.

13. The system of claim 8, wherein:

the APU controller is further operable to compare the APU operational parameter to a setpoint value and, if the APU operational parameter is within a predetermined range of the setpoint value, supply an APU inlet door position command; and the APU inlet door actuator is operable, in response to the APU inlet door open command, to move to a position representative of the commanded APU inlet door open position.

14. An auxiliary power unit (APU) inlet door control system, comprising:

an APU controller adapted to receive an APU start initialization signal indicating that the APU is initialized for started up, and a signal representative of an APU operational parameter, the APU controller operable, in response to these signals, to supply APU inlet door position commands; and an APU inlet door actuator adapted to couple to an APU inlet door, the APU inlet door actuator coupled to receive the APU inlet door position commands and operable, in response thereto, to move to a position representative of the commanded APU inlet door position, wherein:

the APU controller, upon receipt of the APU start initialization signal, supplies an APU inlet door position command representative of a predetermined APU inlet door start position, and the APU inlet door actuator, upon receipt of the APU inlet door position command, moves to a position representative of the predetermined APU inlet door start position.

15. The system of claim 14, wherein:

the APU controller is further adapted to receive an APU start completion signal, the APU start completion signal indicating that the APU has been started and is operational; and the APU controller is further operable, upon receipt of the APU start completion signal, to cease supplying updated APU inlet door position commands.

16. The system of claim 15, wherein the APU controller, from receipt of the APU start initialization signal until receipt of the start completion signal, is operable to supply only APU inlet door position commands that will result in increased airflow to the APU.

17. The system of claim 15, wherein the APU controller, upon receipt of the APU start completion signal, continuously supplies the APU inlet door position command that was supplied to the APU inlet door actuator when the start completion signal was received.

* * * * *